United States Patent [19]
Miller

[11] Patent Number: 6,069,909
[45] Date of Patent: May 30, 2000

[54] EXCIMER LASER WITH IMPROVED WINDOW MOUNT

[75] Inventor: John L. Miller, Livermore, Calif.

[73] Assignee: XMR, Inc., Fremont, Calif.

[21] Appl. No.: 09/264,329

[22] Filed: Mar. 8, 1999

[51] Int. Cl.[7] .................................................. H01S 3/08
[52] U.S. Cl. .............................. 372/103; 372/57; 372/59; 372/10
[58] Field of Search ............................ 372/103, 59, 57, 372/108, 99, 107

[56] References Cited

U.S. PATENT DOCUMENTS

| | | | |
|---|---|---|---|
| 4,534,034 | 8/1985 | Hohla et al. | 372/59 |
| 4,674,099 | 6/1987 | Turner | 372/59 |
| 4,723,254 | 2/1988 | Turner | 372/59 |
| 4,959,840 | 9/1990 | Akins et al. | 372/57 |
| 4,964,137 | 10/1990 | Aramaki et al. | 372/59 |
| 5,001,721 | 3/1991 | Ludewig et al. | 372/59 |
| 5,001,873 | 3/1991 | Rufin | 51/320 |
| 5,073,896 | 12/1991 | Reid et al. | 372/59 |
| 5,090,020 | 2/1992 | Bedwell | 372/59 |
| 5,111,473 | 5/1992 | Rebhan et al. | 372/59 |
| 5,136,605 | 8/1992 | Basting et al. | 372/59 |
| 5,237,583 | 8/1993 | Brimacombe | 372/107 |
| 5,319,663 | 6/1994 | Reid et al. | 372/59 |
| 5,373,523 | 12/1994 | Fujimoto et al. | 372/59 |
| 5,430,752 | 7/1995 | Basting et al. | 372/59 |

*Primary Examiner*—Leon Scott, Jr.
*Attorney, Agent, or Firm*—Skjerven, Morrill, MacPherson, Franklin & Friel LLP

[57] ABSTRACT

An improved excimer laser is disclosed. In one embodiment, the laser includes laser beam generating circuitry operable to generate a laser beam and a vessel enclosing the laser beam generating circuitry. The vessel contains a volume of gas conducive to the formation of the laser beam by the laser beam generating circuitry. The vessel has a wall with a beam aperture formed therein to permit the laser beam generated by the laser beam generating circuitry to pass through it. A window mount assembly is attached to the wall of the vessel. The window mount assembly encloses a beam cavity and has a window that transmits the laser beam. The window is positioned at a first, closed end of the beam cavity. The beam cavity has a second, open end adjoining the beam aperture formed in the vessel wall. The beam cavity has a lateral surface extending between the first and second ends. A plenum lies outside the beam cavity. A gas handling system extracts the gas from the vessel and provides the gas to the plenum. A slot formed in the window mount assembly extends between the plenum and the lateral surface of the beam cavity. The slot forms a gas inlet aperture in the lateral surface of the beam cavity proximate to the first end of the beam cavity. The slot provides a flow of gas from the plenum to the beam cavity.

20 Claims, 7 Drawing Sheets

SECTION A-A

SECTION C-C

SECTION D-D

EXCIMER LASER WITH IMPROVED WINDOW MOUNT

TECHNICAL FIELD OF THE INVENTION

The present invention relates to lasers, and in particular to an excimer laser with an improved window mount.

BACKGROUND OF THE INVENTION

In a conventional excimer laser, a frequent problem is the formation of a contaminant film on the interior surfaces of the laser's windows. This film is typically caused by the accretion of metallic particulate contaminants such as nickel chloride from the laser's electrodes. These particulate contaminants become suspended within the gaseous interior of the laser and drift to the windows, where they accumulate and interfere with laser beam transmission. As a result, the laser's windows must be removed and either cleaned or replaced as often as once every two million laser pulses. With a laser pulse frequency of 300 Hz, this may require a 10- to 20-minute window replacement procedure every one to three hours. This procedure, which may also result in the loss of a significant amount of the expensive gas mixture contained within the laser, adds considerably to the cost of operation of the laser.

SUMMARY OF THE INVENTION

Therefore, a need has arisen for a laser that addresses the disadvantages and deficiencies of the prior art. In particular, a need has arisen for an excimer laser with the capability to operate for a longer period without window replacement. Furthermore, a need has arisen for an excimer laser with a window assembly that allows rapid and convenient window changes with minimal loss of the laser's internal gas mixture.

Accordingly, an improved excimer laser is disclosed. In one embodiment, the laser includes laser beam generating circuitry operable to generate a laser beam and a vessel enclosing the laser beam generating circuitry. The vessel contains a volume of gas conducive to the formation of the laser beam by the laser beam generating circuitry. The vessel has a wall with a beam aperture formed therein to permit the laser beam generated by the laser beam generating circuitry to pass through it. A window mount assembly is attached to the wall of the vessel. The window mount assembly encloses a beam cavity and has a window that transmits the laser beam. The window is positioned at a first, closed end of the beam cavity. The beam cavity has a second, open end adjoining the beam aperture formed in the vessel wall. The beam cavity has a lateral surface extending between the first and second ends. A plenum lies outside the beam cavity. A gas handling system extracts the gas from the vessel and provides the gas to the plenum. A slot formed in the window mount assembly extends between the plenum and the lateral surface of the beam cavity. The slot forms a gas inlet aperture in the lateral surface of the beam cavity proximate to the first end of the beam cavity. The slot provides a flow of gas from the plenum to the beam cavity.

An advantage of the present invention is that a uniform gas flow is provided around the entire circumference of the beam cavity, minimizing secondary flows or eddies in the beam cavity which may carry contaminants to the window. Another advantage of the present invention is that the window is mounted in a removable cassette to simplify and speed up window change procedures.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiments of the present invention and their advantages are best understood by referring to FIGS. 1A through 9B of the drawings. Like numerals are used for like and corresponding parts of the various drawings.

Figure 1B:
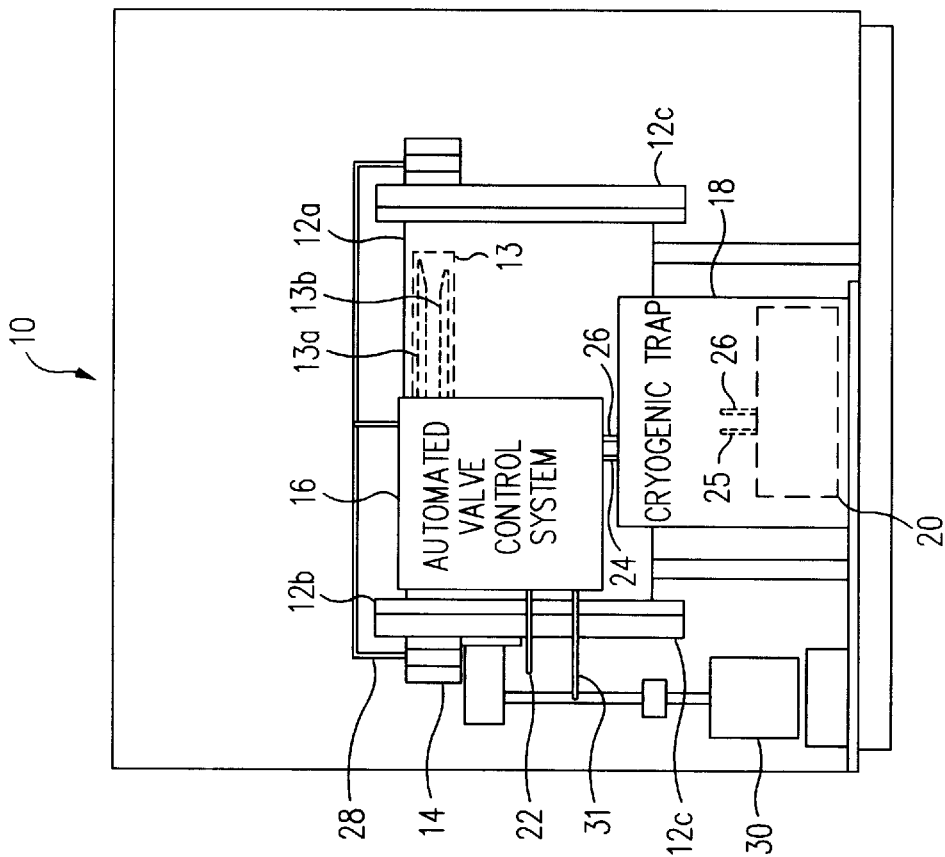
FIGS. 1A and 1B are front and side views, respectively, of a laser constructed in accordance with the present invention.
Figure 1A:
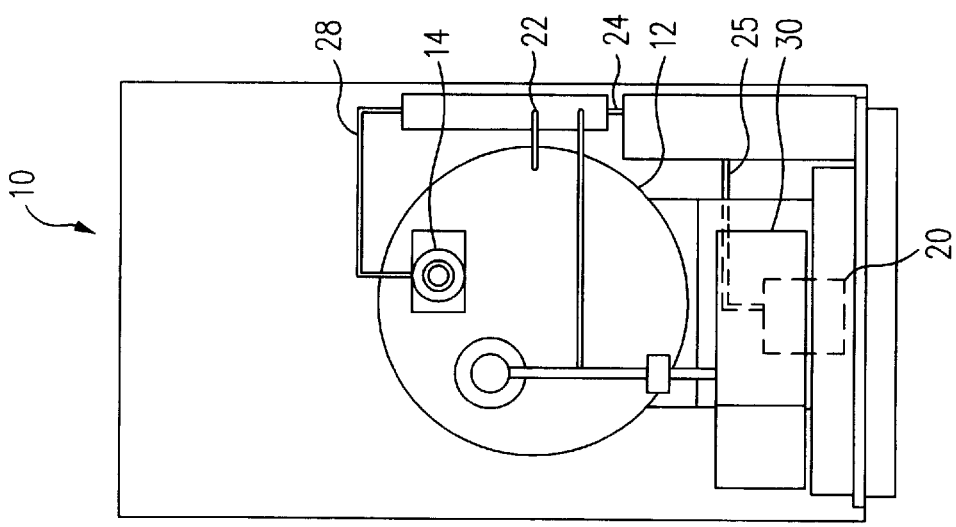

FIGS. 1A and 1B are front and side views, respectively, of a laser 10 constructed in accordance with the present invention. Laser 10 may be, for example, a high-power XeCl excimer laser. Laser 10 includes a cylindrical pressure vessel 12 approximately 30 inches in diameter and 40 inches in length. Vessel 12 comprises a cylindrical shell 12a with flanges 12b. End plates 12c are bolted to flanges 12b and a pressure-resistant seal is formed therebetween for the containment of gas inside vessel 12.

Vessel 12 contains a gas mixture including an inert gas such as neon, which comprises the bulk of the gas in vessel 12, as well as active "lasing" gases such as xenon and hydrogen chloride (HCl). This gas mixture is contained at high pressure, such a six atmospheres, within vessel 12. The precise composition of the gas mixture in vessel 12 may be selected in accordance with principles well known in the art of excimer lasers.

Vessel 12 contains a tangential blower (not shown) for circulating the gas mixture within vessel 12. Vessel 12 also contains laser circuitry 13, including capacitive elements and opposing electrodes 13a, 13b for creating a high electric field through a portion of the gas mixture to stimulate coherent radiation therefrom. Both the tangential blower and the laser circuitry are of conventional design.

Each end plate 12c of vessel 12 has an aperture formed therein over which a window mount assembly 14 is mounted. Window mount assembly 14 has a transparent window (not explicitly shown in FIGS. 1A and 1B) through which laser radiation may pass. Window mount assembly 14 will be described more fully below. Outside each window mount assembly 14 is a mirror (not shown) of conventional design and arrangement.

Laser 10 also includes a gas handling system comprising an automated valve control system 16, a cryogenic trap 18 and a gas circulation pump 20. During normal operation of laser 10, the gas handling system is used to remove both particulate and gaseous impurities from the gas mixture in vessel 12. To this end, gas is extracted from vessel 12 through an aperture in an end plate 12c. The gas is transported through tubing 22 to automated valve control system 16. From there, the gas is transported via tubing 24 to cryogenic trap 18, which purifies the gas mixture in a conventional manner, and thence to gas circulation pump 20 via tubing 25. The gas is then returned through cryogenic trap 18 to automated valve control system 16 via tubing 26. Finally, the gas is transported by tubing 28 to window mount assemblies 14 in a manner which will be described below.

The gas handling system also includes a vacuum pump 30 connected to automated valve control system 16 by tubing 31. Vacuum pump 30 may be used to evacuate vessel 12 prior to filling vessel 12 with inert gas. Vacuum pump 30 may also be used to remove the gas mixture from window mount assemblies 14 during periodic window changes, as will be described more fully below.

Figure 2:
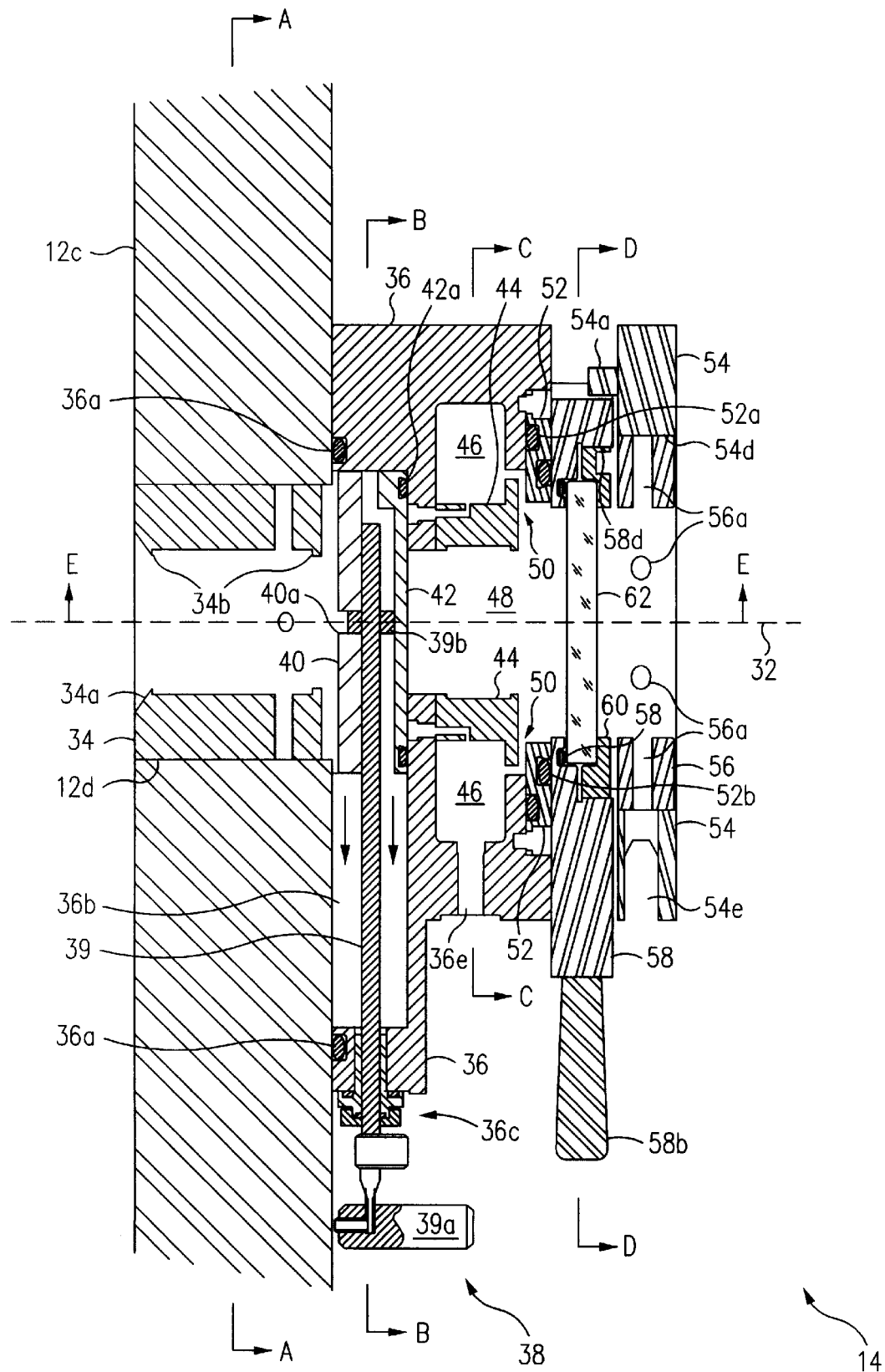
FIG. 2 is a top-view cross section of a window mount assembly for use with the laser.
Figure 3:
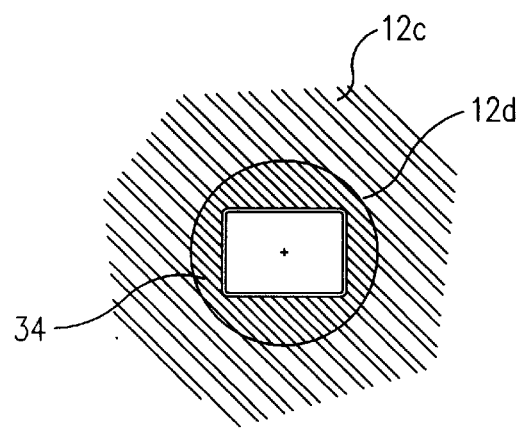
FIGS. 3 through 7 are further cross sections of the window mount assembly.

Referring to FIG. 2, a top-view cross section of a window mount assembly 14 and a portion of an end wall 12c of vessel 12 is shown. Various sectional views (A—A, B—B, etc.) of end wall 12c and window mount assembly 14 are denoted in FIG. 2. These sectional views are shown in FIGS. 3 through 7.

In the following description, the term "upstream" will be used to denote a direction toward the interior of vessel 12 (to the left in FIG. 2), the direction from which the laser beam originates. The term "downstream" will be used to denote a direction away from the interior of vessel 12 along the laser beam axis 32, the direction in which the laser beam travels. Note that these terms do not refer to the direction of gas flow in window mount assemblies 14, which will generally be opposite the direction of beam travel, as will be described more fully below.

End wall 12c of vessel 12 has a circular aperture 12d centered on laser beam axis 32. Placed within aperture 12d is an insert 34 with a cylindrically-shaped outer surface and a rectangular inner surface corresponding to the shape of the laser beam. In this example, insert 34 has a beam aperture measuring 29 mm×40 mm, while the beam size is 25 mm×36 mm. Insert 34 is attached to end wall 12c by means of set screws (not shown).

The inner surface of insert 34 has tapered edges 34a on its upstream side. Tapered edges 34a are to prevent secondary flows or eddies from forming in the gas flow from window mount assembly 14 into vessel 12. The inner surface of insert 34 also has small steps 34b projecting inward at the edges of the inner surface. Steps 34b block low-angle reflections of light from the inner surface of insert 34.

A window mount 36 provides the primary structural framework and support for window mount assembly 14. Window mount 36 is bolted to end wall 12c (bolts not shown), and sealed to end wall 12c by an O-ring 36a. O-ring 36a and other O-rings in window mount assembly 14 are preferably made from a stable material able to withstand high pressure, such as Viton.

Figure 4:
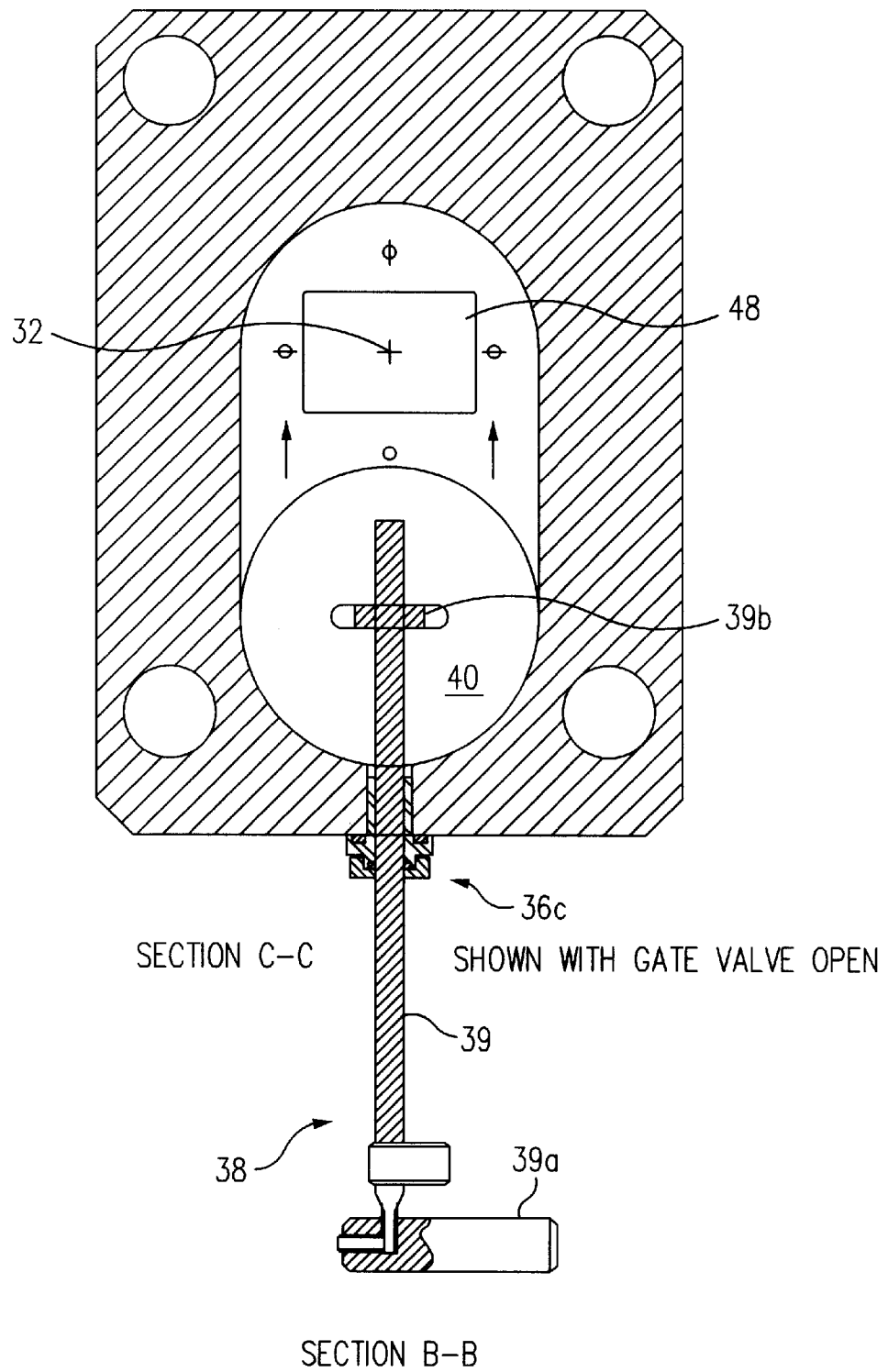

Window mount 36 forms an elongated cavity 36b adjacent to end wall 12c and aperture 12d. Cavity 36b extends to one side of beam axis 32. Cavity 36b houses a movable pressure seal assembly 38, which may be moved into and out of alignment with beam axis 32. During normal laser operation, pressure seal assembly 38 is moved out of alignment with beam axis 32. This position is referred to as the "open" position, and is illustrated in FIG. 4. During maintenance procedures such as the window change operation described below, pressure seal assembly 38 may be moved into alignment with beam axis 32. This latter position is referred to as the "closed" position, and is illustrated in FIG. 2.

Pressure seal assembly 38 includes a rod 39, a first disk 40 on the upstream side of rod 39, and a second disk 42 on the downstream side of rod 39. Rod 39 is connected to window mount 36 by a slidable pressure seal 36c, which allows rod 39 to be moved along its axis and rotated about its axis while maintaining a pressure seal between cavity 36b and the atmosphere. Rod 39 has a handle 39a attached thereto to allow manual rotation and sliding of rod 39.

Rod 39 has a cam 39b attached thereto in alignment with the centers of disks 40 and 42. Cam 39b is cylindrical in shape and is mounted off-center with respect to the axis of rod 39. Cam 39b is aligned with a corresponding slot 40a in disk 40. Cam 39b allows a pressure seal to be formed between cavity 36b and the remainder of the interior of window mount assembly 14, as follows.

Prior to performing a window change operation, window mount assembly 38 is moved into the closed position, as indicated by directional arrows in FIG. 4. The closed position is illustrated in FIG. 2. Rod 39 is then rotated so that cam 39b extends primarily downstream, in the direction opposite slot 40a in disk 40. As a result, cam 39b presses against the upstream surface of disk 42, while rod 39 presses against the downstream surface of disk 40. Disk 42 has a partially recessed O-ring 42a which forms a seal between disk 42 and the downstream wall of cavity 36b. Thus, the gas mixture contained in vessel 12, aperture 12d and cavity 36b is isolated from the downstream portion of window mount assembly 14.

After a window change operation (to be described below) is complete, rod 39 is rotated so that cam 39b extends primarily in the upstream direction, projecting into slot 40a in disk 40. This relieves pressure on both disks 40 and 42, allowing pressure seal assembly 38 to be moved into the open position, as indicated by directional arrows in FIG. 2. The open position is illustrated in FIG. 4. Normal operation of laser 10 may then be resumed.

Returning to FIG. 2, a baffle 44 is mounted on window mount 36 by a non-sealing attachment means such as screws. Baffle 44 forms an integral part of the structure of window mount 36, but is by necessity machined separately from window mount 36 due to the complex shape defined by window mount 36 and baffle 44. Baffle 44, like insert 34, has a cylindrically-shaped outer surface and a rectangular inner surface corresponding to the shape of the laser beam. The inner surface of baffle 44 may have the same dimensions as the inner surface of insert 34. Furthermore, baffle 44 may have a recessed inner surface with steps at the edges, similar to steps 34b in the inner surface of insert 34. The inner surface of baffle 44 defines a beam cavity 48 centered on beam axis 32. When pressure seal assembly 38 is in the open position, beam cavity 48 extends to insert 34.

Together, window mount 36 and the outer surface of baffle 44 form an annular plenum 46 extending around beam cavity 48. Window mount 36 has two feedthroughs 36d and 36e formed therein (shown in FIG. 5). Tubing 28 from automated valve control system 16 is connected to feedthrough 36d and provides gas to plenum 46.

Feedthrough 36e may be connected to a leak detector (not shown) during assembly and testing of laser 10. During normal operation of laser 10, feedthrough 36e may be plugged to prevent gas from escaping from plenum 46.

Figure 5:
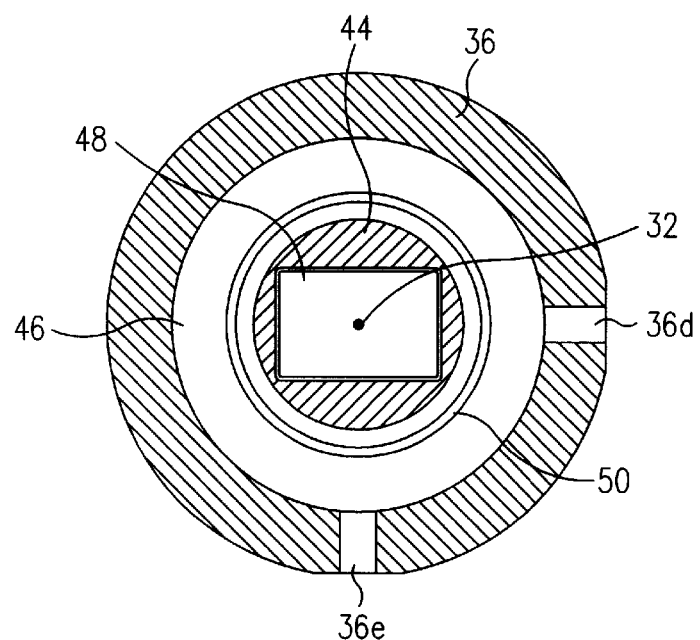

Together, window mount 36 and baffle 44 form a cylindrically symmetrical slot 50 leading from plenum 46 to cavity 48. Slot 50 allows the introduction of gas from plenum 46 into cavity 48 around the entire circumference of plenum 48. Window mount 36, baffle 44, plenum 46 and slot 50 are also illustrated in FIG. 5. The advantageous characteristics of plenum 46 and slot 50, which significantly reduce maintenance requirements for window mount assembly 14, will be described more fully below in connection with the operation of laser 10.

Returning to FIG. 2, an annulus 52 is attached to a downstream surface of window mount 36 outside plenum 46 by set screws. Annulus 52 is sealed to the surface of window mount 36 by means of an O-ring 52a. Annulus 52 forms an integral part of the structure of window mount 36, but is by necessity machined separately from window mount 36 so as to allow baffle 44 to be inserted within window mount 36. Annulus 52 creates a right-angle turn in slot 50 leading from plenum 46 to cavity 48. The advantage conferred by the shape and other characteristics of slot 50 will be described more fully below in connection with the operation of laser 10.

A window cassette holder 54 is bolted on to a downstream surface of window mount 36. The three-dimensional shape of window cassette holder 54 is perhaps best illustrated in FIG. 8, in which window cassette holder 54 is rotated 90 degrees from its orientation in FIG. 2 in order to best illustrate the shape of window cassette holder 54. In the actual implementation illustrated in FIG. 2, window cassette holder 54 is oriented so that slot 54e faces downward. However, it will be understood that no particular orientation of window cassette holder 54 is required by the present invention.

An alignment peg 54a extends in the upstream direction, providing a stop for a window cassette as will be described more fully below. Bolt holes 54b allow bolts to be inserted and screwed into corresponding threaded holes (not shown) in window mount 36.

Figure 8:
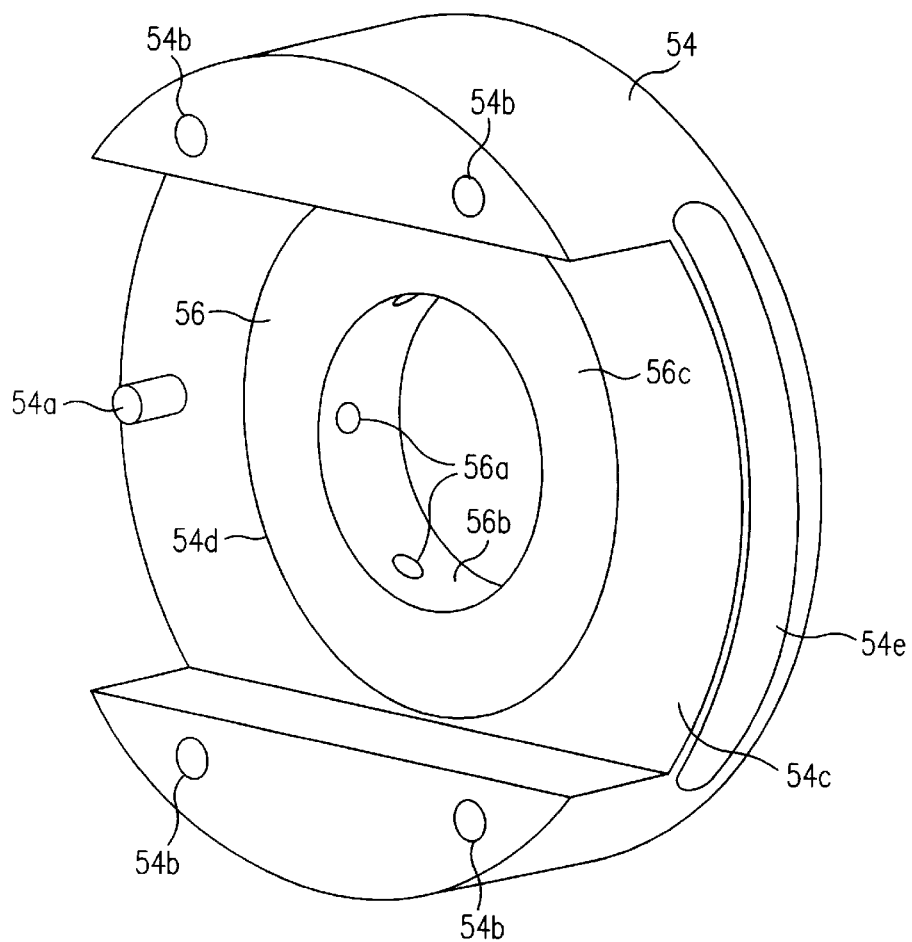
FIG. 8 is a perspective view of a window cassette holder for use in the window mount assembly.

Between bolt holes 54b on the left and right sides, respectively, of window cassette holder 54 (top and bottom sides as shown in FIG. 8), a recessed portion 54c of window cassette holder 54 forms a slot between window cassette holder 54 and window mount 36. This slot allows a window cassette to be inserted into and removed from window assembly 14, as will be described more fully below.

A threaded circular aperture 54d is formed in recessed portion 54c of window cassette holder 54. A slot 54e is formed on one side of window cassette holder 54 and extends through to aperture 54d. An annular clamp ring 56 with a threaded outer surface may be screwed into threaded aperture 54d. Clamp ring 56 may be tightened to exert pressure against a window cassette inserted into recessed portion 54c of window cassette holder 54, as will be described more fully below.

Clamp ring 56 has thru-holes 56a placed periodically around its circumference and extending from its inner surface 56b to its outer, threaded surface. Thru-holes 56a are aligned with a slot 54e when the upstream face 56c of clamp ring 56 is approximately flush with the face of recessed portion 54c of window cassette holder 54. A rod (not shown) may be inserted through slot 54e and into a thru-hole 56a in clamp ring 56. The rod provides leverage to tighten (by counterclockwise rotation as shown in FIG. 8) or loosen (by clockwise rotation as shown in FIG. 8) clamp ring 56 within window cassette holder 54, as will be described more fully below.

Figure 6:
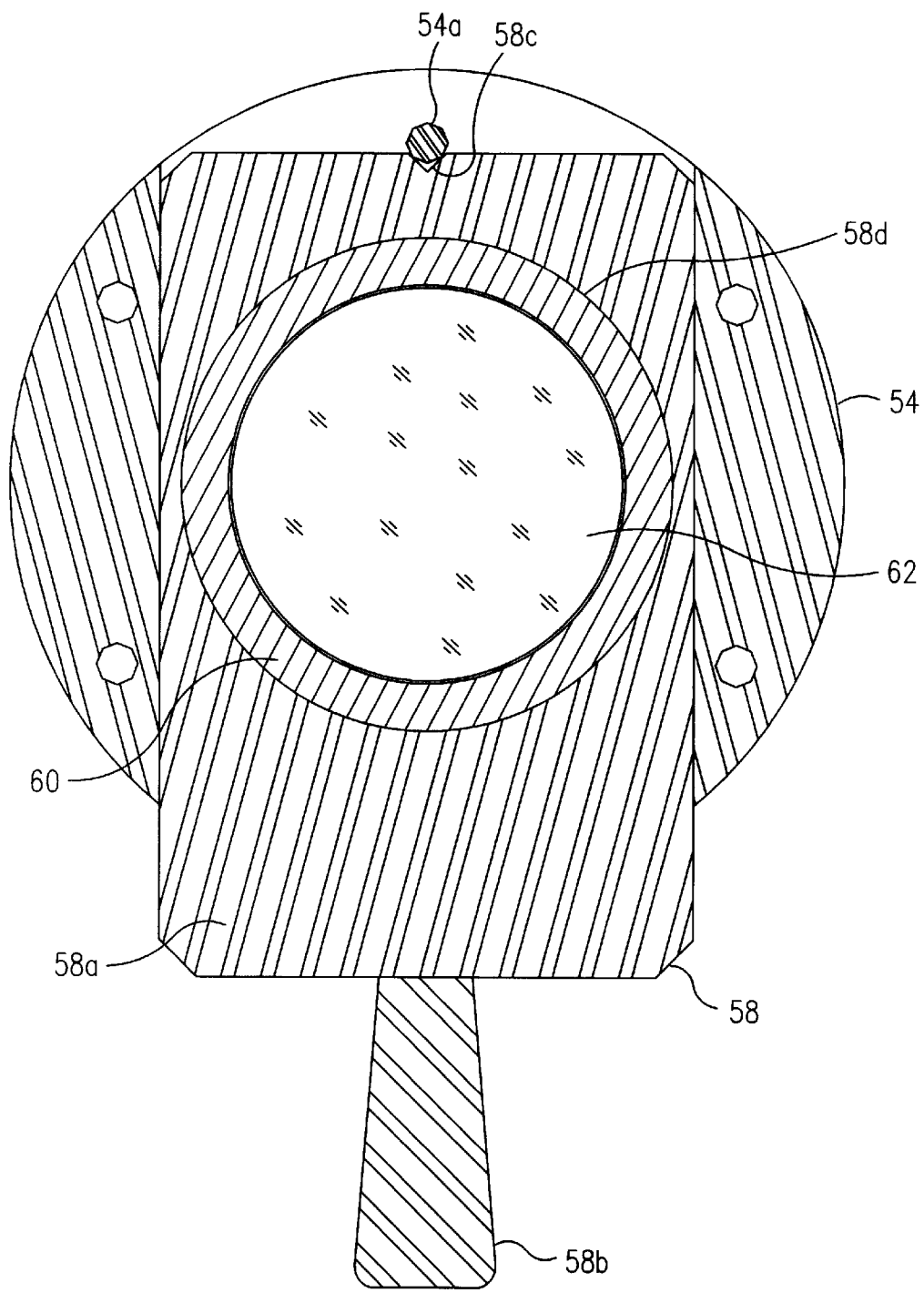
Figure 7:
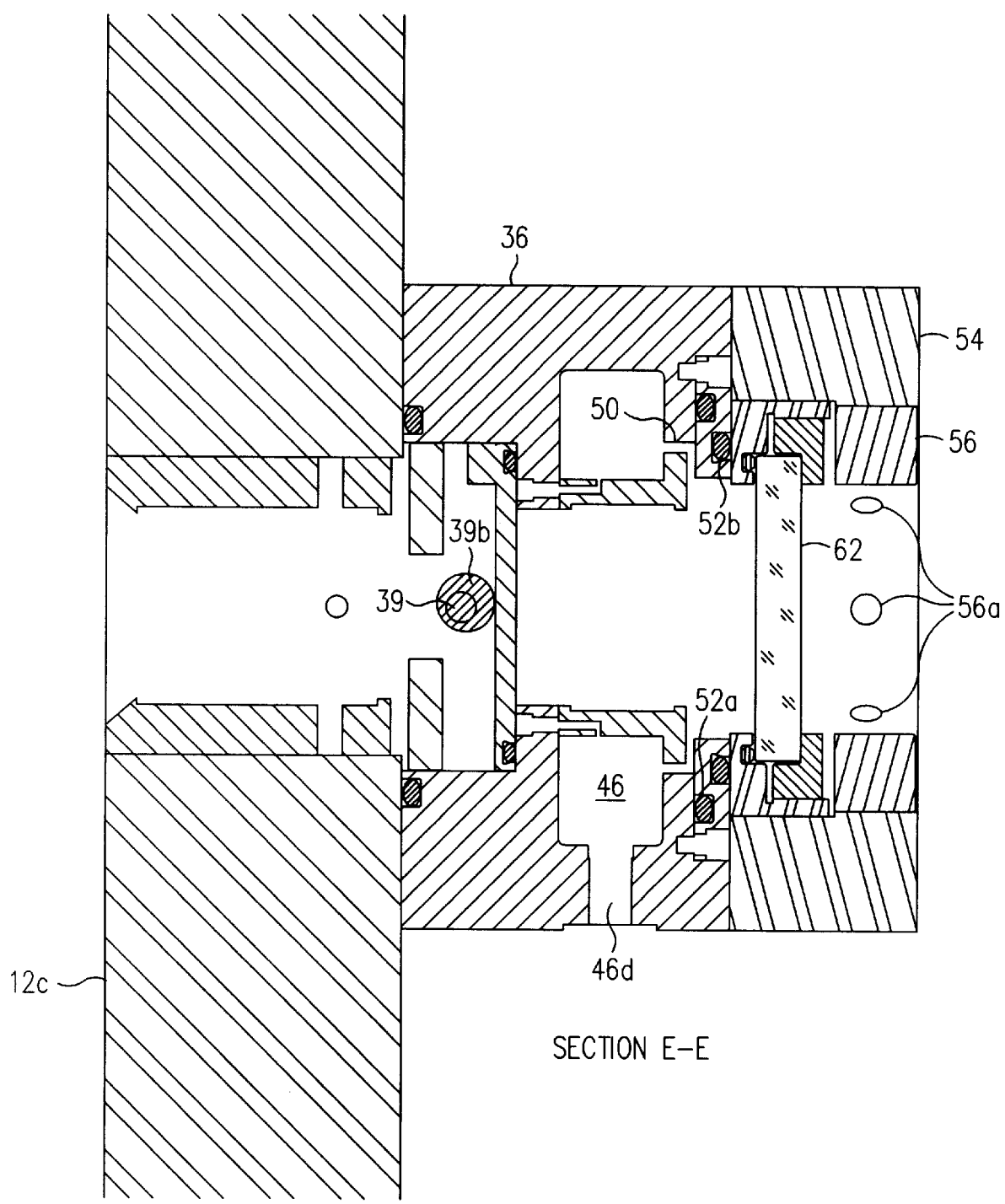
Figures 9A, 9B:
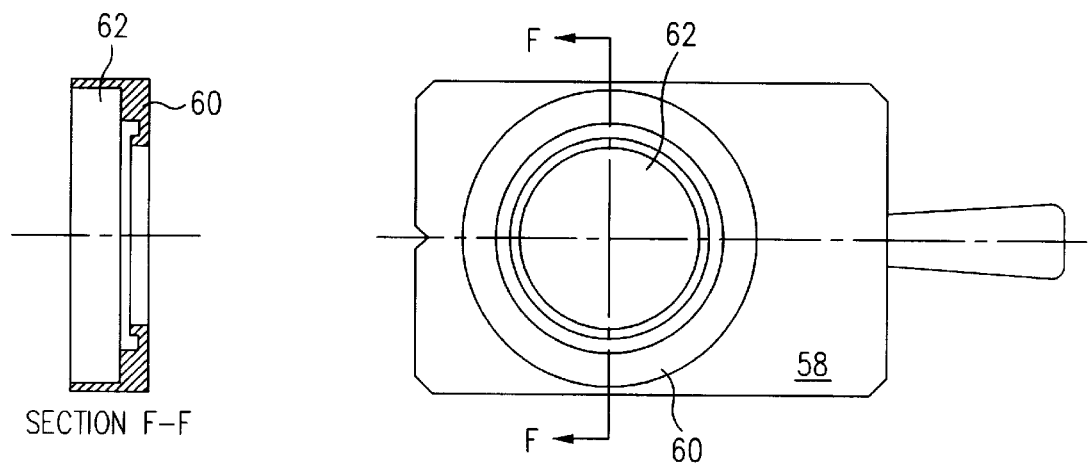
FIGS. 9A is a front view of a window cassette for use in the window mount assembly.
FIG. 9B is a cross section of the window cassette.

Returning to FIG. 2, a window cassette 58 may be inserted into the slot area between window cassette holder 54 and window mount 36. Window cassette 58 is also shown in FIGS. 6, 9A and 9B. Referring to FIG. 6, window cassette 58 has a generally rectangular body 58a and a handle 58b to allow manual insertion and removal of window cassette 58 from window mount assembly 14. Body 58a of window cassette 58 has a notch 58c formed in its upper surface to accommodate alignment peg 54a of window cassette holder 54, so that when window cassette 58 is inserted into the cassette slot area in window mount assembly 14, alignment peg 54a stops window cassette 58 at the desired position.

When window cassette 58 is inserted into the cassette slot area in window mount assembly 14, the upstream surface of window cassette 58 rests against an O-ring 52b held by annulus 52. When clamp ring 56 is tightened as previously described, the upstream surface of window cassette 58 presses against O-ring 52b, thereby forming a pressure-tight seal.

Body 58a of window cassette 58 has a threaded circular aperture 58d formed therein. An annular window frame 60 with a threaded outer surface may be screwed into aperture 58d. Window frame 60 holds a disk-shaped window 62 formed from a transparent material such as $MgF_2$. Window 62 projects in the upstream direction beyond the upstream surface of window frame 60. Thus, when window frame 60 is screwed into window cassette 58, the upstream surface of window 62 presses against an O-ring 58e held by window cassette 58, as shown in FIG. 2.

The operation of laser 10 will now be described. During normal laser operation, electrodes 13a, 13b discharge at a constant frequency such as, for example, 300 Hz. This discharge generates a laser beam through window mount assemblies 14.

To prevent suspended particulate contaminants from electrodes 13a, 13b from migrating to and accreting on windows 62 in window mount assemblies 14, a constant flow of gas is maintained through each window mount assembly 14 in the upstream direction toward the interior of vessel 12. This constant flow is maintained by gas circulation pump 20, which provides a flow of gas into plenum 46 in each window mount assembly 14. By keeping plenum 46 at a slightly higher pressure than cavity 48, gas circulation pump 20 ensures a constant flow of gas through slot 50, through cavity 48 and into vessel 12.

Plenum 46 and slot 50 are designed to create a relatively high and very uniform flow of gas through cavity 48 and the aperture in insert 34. This uniform flow is important because any non-uniformity in the gas flows, and in particular secondary flows or eddies, may allow particulate contaminants from vessel 12 to be carried toward window 62.

To this end, slot 50 extends around the entire circumference of cavity 48, allowing gas to be introduced into cavity 48 from its entire periphery. This design creates a more uniform flow through cavity 48 than would occur if, for example, a narrow tube were used to conduct gas between plenum 46 and cavity 48.

In addition, slot 50 is designed to provide gas to cavity 48 at a relatively low velocity for a given flow rate. This is advantageous because a high-velocity jet of gas into cavity 48 would be more likely to cause secondary flows. The cylindrical symmetry of slot 50, with the resulting large surface area of slot 50 as seen from cavity 48, allows a low gas velocity exiting slot 50 for a given overall flow rate. Furthermore, since the velocity of gas exiting slot 50 varies inversely with the width of slot 50, slot 50 is designed to have sufficient width to cause a low gas velocity. The width of slot 50 will be described more fully below. In addition, the right-angle turn in slot 50, caused by annulus 52, encourages uniform, low-velocity flow from slot 50.

In order maximize gas flow in cavity 48, the introduction of gas into cavity 48 must be uniform around the entire circumference of cavity 48. Thus, despite the fact that gas is introduced into plenum 46 at a single point (feedthrough 36d), with a resulting net gas flow to the opposite side of plenum 46, the gas pressure throughout plenum 46 must be relatively uniform. The maintenance of uniform pressure in plenum 46 requires that the gas flow around the circumference of plenum 46 from feedthrough 36d be relatively low in comparison to the cross-sectional area of plenum 46. This in turn requires that slot 50 be relatively narrow in comparison to the cross-sectional area of plenum 46.

Thus, maintaining uniformity of gas flow through cavity 48 requires a compromise in the width of slot 50 between, on one hand, the need to minimize the velocity of the gas emerging from slot 50 into cavity 48 and, on the other hand, minimizing the pressure differential around the circumference of plenum 46. To achieve this compromise, the dimensions of slot 50 are chosen such that the ratio of the gas velocity in slot 50 to the gas velocity in plenum 46 is approximately equal to three, and so that the ratio of the gas velocity in slot 50 to the gas velocity in cavity 48 is also approximately equal to three. The first ratio makes the gas pressure drop across slot 50 (from plenum 46 to cavity 48) approximately 10 times the pressure drop from feedthrough 36d to the opposite side of plenum 46. While these ratios do not necessarily maximize the uniformity of gas flow through cavity 48, they have been found to achieve a very satisfactory uniformity and a correspondingly slow accumulation of contaminants on window 62.

To achieve the above-described ratios, the dimensions of the relevant parts of window mount assembly 14 are as follows: Plenum 46 has an inner diameter of 53 mm, an outer diameter of 100 mm, and a width of 23 mm. Slot 50 has a width of 2 mm and a total length of 10 mm from plenum 46 to cavity 48. The gas flow rate from plenum 46 to cavity 48 is 20 liters per minute.

The accumulation of contaminants on window 62 is also minimized by maximizing the gas velocity in the upstream direction in cavity 48. Thus, cavity 48 preferably has the smallest possible cross section, which increases gas velocity through cavity 48 for any given gas flow rate. The small cross section of cavity 48 also helps to maximize the uniformity of gas flow through cavity 48.

Thus, cavity 48 is shaped to conform to the shape of the laser beam, with minimal clearance on all sides of the beam. In one embodiment, the dimensions of cavity 48 at its narrowest point are 29 mm by 40 mm, while the dimensions of the laser beam are 25 mm by 36 mm. Cavity 48 therefore provides two millimeters of clearance on all sides of the laser beam in this embodiment. It may be possible to use an even smaller clearance.

Many of the above-described design features of window mount assembly 14 are designed to minimize the frequency of window changes needed during the operation of laser 10. However, window mount assembly 14 is designed not only to minimize the frequency of window changes needed, but also to facilitate the window changes themselves in order to minimize the down-time of laser 10 caused by window maintenance. To this end, window 62 is mounted within a removable window cassette 58 as previously described. The procedure for changing windows will now be described.

When a window change is to be performed, pressure seal assembly 38 is moved from the open position to the closed position, as indicated by directional arrows in FIG. 4. Rod 39 is then rotated to press O-ring 42a against the surface of window mount 36, forming a pressure-tight seal. The gas contained in plenum 46 and cavity 48 is then vented to the atmosphere by means of feedthrough 36d, preferably through a hood vent or some other containment mechanism due to the poisonous nature of the gas mixture contained in laser 10. Plenum 46 and cavity 48 are then evacuated by means of vacuum pump 30. Plenum 46 and cavity 48 may then be purged with an inert gas such as neon by means of feedthrough 36d.

When the venting of gas from plenum 46 and cavity 48 is complete, clamp ring 56 may be loosened by inserting a rod through slot 54e and a thru-hole 56a and turning clamp ring 56 within threaded aperture 54d of window cassette holder 54. The rod may be inserted into and removed from various thru-holes 56a during this turning process to achieve sufficient loosening of clamp ring 56.

Once clamp ring 56 has been loosened, window cassette 58 may be manually removed from window mount assembly 14 by means of handle 58b. Another prepared window cassette may then be inserted into window mount assembly 14. Alternatively, window cassette 58 may be re-used by unscrewing window frame 60 therefrom and inserting a fresh window and frame. In either case, the above-described removal process is then reversed, i.e. clamp ring 56 is tightened, inert gas is re-introduced into plenum 46 and cavity 48, and pressure seal assembly 38 is moved to the open position. Normal operation of laser 10 may then be resumed. It will be appreciated that this window change operation may be accomplished in a relatively short time, minimizing the down time of laser 10 for window maintenance.

Although the present invention and its advantages have been described in detail, it should be understood that various changes, substitutions, and alterations can be made therein without departing from the spirit and scope of the invention as defined by the appended claims.

I claim:

1. A laser comprising:
   laser beam generating circuitry operable to generate a laser beam;
   a vessel enclosing the laser beam generating circuitry, the vessel containing a volume of gas conducive to the formation of the laser beam by the laser beam generating circuitry, the vessel having a wall with a beam aperture formed therein to permit the laser beam generated by the laser beam generating circuitry to pass therethrough;
   a window mount assembly attached to the wall of the vessel, the window mount assembly enclosing a beam cavity, the window mount assembly having a window operable to transmit the laser beam, the window being positioned at a first, closed end of the beam cavity, the beam cavity having a second, open end adjoining the beam aperture formed in the vessel wall, the beam cavity having a lateral surface extending between the first and second ends;
   a plenum external to the beam cavity;
   a gas handling system operable to extract the gas from the vessel, the gas handling system being operable to provide the gas to the plenum;
   a slot formed in the window mount assembly, the slot extending between the plenum and the lateral surface of the beam cavity, the slot forming a gas inlet aperture in the lateral surface of the beam cavity, the gas inlet aperture being formed proximate to the first end of the beam cavity, the slot being operable to provide a flow of gas from the plenum to the beam cavity.

2. The laser of claim 1, wherein the gas inlet aperture extends around substantially the entire lateral surface of the beam cavity.

3. The laser of claim 1, wherein the gas handling system comprises a gas purifying mechanism.

4. The laser of claim 3, wherein the gas purifying mechanism comprises a cryogenic trap.

5. The laser of claim 3, wherein the gas handling system comprises a pump.

6. The laser of claim 1, wherein the window mount assembly further comprises:

a window mount having an externally accessible slot formed therein, the slot extending to the beam cavity; and a cassette having a window mounted therein, the cassette being operable to slide into the slot formed in the window mount, the window being mounted in the cassette such that the window is aligned with the beam cavity when the cassette is inserted into the window mount.

7. A laser comprising:

laser beam generating circuitry operable to generate a laser beam;

a vessel enclosing the laser beam generating circuitry, the vessel containing a volume of gas conducive to the formation of the laser beam by the laser beam generating circuitry, the vessel having a wall with a beam aperture formed therein to permit the laser beam generated by the laser beam generating circuitry to pass therethrough;

a window mount assembly attached to the wall of the vessel adjoining the beam aperture, the window mount assembly having:

a window mount having an externally accessible slot formed therein, the slot extending to a beam axis of the window mount assembly;

a cassette having a window mounted therein, the cassette being operable to slide into the slot formed in the window mount, the window being mounted in the cassette such that the beam axis intersects the window when the cassette is inserted into the window mount; and a locking mechanism operable to hold the cassette within the window mount, and operable to release the cassette from the window mount.

8. The laser of claim 7, wherein the locking mechanism comprises a threaded aperture formed in the window mount assembly; and a clamp ring having threads operable to engage corresponding threads of the threaded aperture formed in the window mount assembly, the clamp ring being operable to exert pressure on the cassette in response to rotation of the clamp ring within the threaded aperture formed in the window mount assembly.

9. The laser of claim 7, wherein the cassette further comprises:

a body having a threaded aperture formed therein; and a window frame holding the window, the window frame having threads operable to engage corresponding threads of the threaded aperture of the body.

10. The laser of claim 7, wherein the laser window mount assembly further comprises an adjustable isolation mechanism operable to provide selective isolation of the window mount assembly from a laser beam generating area external to the window mount assembly.

11. The laser of claim 10, wherein the isolation mechanism comprises a pressure seal assembly mounted within a cavity formed in the window mount assembly, the pressure seal assembly comprising:

an externally accessible rod operable to move the pressure seal assembly within the cavity, and operable to rotate within the cavity, the rod having a cam formed thereon;

a pressure seal plate coupled to the rod, the pressure seal plate being configured to press against a surface of the cavity to form a pressure seal between an interior of the window mount assembly and the laser beam generating area in response to force applied by the cam when the rod is rotated to a first selected position, the pressure seal plate being configured to release from the surface of the cavity in response to the release of force applied by the cam when the rod is rotated to a second selected position.

12. A laser window mount assembly comprising:

a window mount having an externally accessible slot formed therein, the slot extending to a beam axis of the window mount assembly;

a cassette having a window mounted therein, the cassette being operable to slide into the slot formed in the window mount, the window being mounted in the cassette such that the window intersects the beam axis when the cassette is inserted into the window mount; and a locking mechanism operable to hold the cassette within the window mount, and operable to release the cassette from the window mount.

13. The laser window mount assembly of claim 12, wherein the locking mechanism comprises a threaded aperture formed in the window mount assembly; and a clamp ring having threads operable to engage corresponding threads of the threaded aperture formed in the window mount assembly, the clamp ring being operable to exert pressure on the cassette in response to rotation of the clamp ring within the threaded aperture formed in the window mount assembly.

14. The laser window mount assembly of claim 12, wherein the cassette further comprises:

a body having a threaded aperture formed therein; and a window frame holding the window, the window frame having threads operable to engage corresponding threads of the threaded aperture of the body.

15. The laser window mount assembly of claim 12, further comprising an adjustable isolation mechanism operable to provide selective isolation of the window mount assembly from a laser beam generating area external to the window mount assembly.

16. The laser window mount assembly of claim 15, wherein the isolation mechanism comprises a pressure seal assembly mounted within a cavity formed in the window mount assembly, the pressure seal assembly comprising:

an externally accessible rod operable to move the pressure seal assembly within the cavity, and operable to rotate within the cavity, the rod having a cam formed thereon;

a pressure seal plate coupled to the rod, the pressure seal plate being configured to press against a surface of the cavity to form a pressure seal between an interior of the window mount assembly and the laser beam generating area in response to force applied by the cam when the rod is rotated to a first selected position, the pressure seal plate being configured to release from the surface of the cavity in response to the release of force applied by the cam when the rod is rotated to a second selected position.

17. A laser comprising:

laser beam generating circuitry operable to generate a laser beam, the laser beam having a first shape;

a vessel enclosing the laser beam generating circuitry, the vessel containing a volume of gas conducive to the formation of the laser beam by the laser beam generating circuitry, the vessel having a wall with a beam aperture formed therein to permit the laser beam generated by the laser beam generating circuitry to pass therethrough;

a window mount assembly attached to the wall of the vessel adjoining the beam aperture, the window mount assembly having:
- a window mounted within the window mount assembly, the window being operable to transmit the laser beam removably;
- a beam cavity enclosed by the window mount assembly, the beam cavity extending from the beam aperture of the vessel wall to the window, a portion of the beam cavity having a cross section with a second shape, the second shape being substantially similar to the first shape, the second shape having a size substantially similar to a size of the first shape;

a gas handling system operable to provide gas to the beam cavity proximate to the window so as to establish a gas flow in a direction away from the window.

18. A method for operating a laser having a vessel and a window mount assembly attached to a wall of the vessel, the window mount assembly having a cavity formed therein extending from a window mounted in the window mount assembly to an aperture formed in the wall of the vessel, the method comprising:

generating a laser beam in the vessel, the laser beam extending through the cavity formed in the window mount assembly, and extending through the window mounted in the window mount assembly; and providing gas to the cavity in the window mount assembly proximate to the window so as to establish a gas flow in a direction away from the window.

19. The method of claim 18, wherein providing gas to the cavity in the window mount assembly comprises feeding gas to the cavity through a slot extending around substantially an entire perimeter of a wall enclosing the cavity.

20. The method of claim 18, further comprising extracting from the vessel the gas provided to the cavity in the window mount.

* * * * *

UNITED STATES PATENT AND TRADEMARK OFFICE
CERTIFICATE OF CORRECTION

PATENT NO. : 6,069,909
DATED : Aug. 1, 2000
INVENTOR(S) : Guglielmi et al

It is certified that error appears in the above-indentified patent and that said Letters Patent is hereby corrected as shown below:

In column 4, line 31-33, change "$(P)'''$" to -- $(P)^2$ --.
In column 5, line 25, change "$c_{\overline{m}}^m$" to -- $c_n^m$ --.
In column 5, line 64, change "Guglieimi" to -- Gugielmi --.
In column 6, line 17, change "$R_5$" to -- $R_6$ --.
In column 7, line 17, change "7" to -- 6c --.
In column 7, line 21, change "7" to -- 6c --.
In column 8, line 21-24, change "$(S_{21}(P))^2$" to -- $S_{21}(P)^2$ --.

Signed and Sealed this

Eighth Day of May, 2001

Attest:

NICHOLAS P. GODICI

Attesting Officer

Acting Director of the United States Patent and Trademark Office